United States Patent [19]
Headley et al.

[11] Patent Number: 5,695,215
[45] Date of Patent: Dec. 9, 1997

[54] FILL TUBE FOR AIR BAG INFLATOR

[75] Inventors: Paul S. Headley; William A. Kopp, both of Mesa; Daniel R. Hake, Scottsdale, all of Ariz.

[73] Assignee: TRW Inc., Lyndhurst, Ohio

[21] Appl. No.: 637,219

[22] Filed: Apr. 24, 1996

[51] Int. Cl.[6] .................................. B60R 21/26
[52] U.S. Cl. ........................... 280/737; 280/741
[58] Field of Search ............................ 280/737, 741

[56] References Cited

U.S. PATENT DOCUMENTS

| | | | |
|---|---|---|---|
| 5,076,607 | 12/1991 | Woods et al. | 280/737 |
| 5,226,669 | 7/1993 | Honda | 280/737 |
| 5,263,740 | 11/1993 | Frey et al. | 280/737 |
| 5,331,126 | 7/1994 | Dwyer et al. | 200/83 P |
| 5,356,176 | 10/1994 | Wells | 280/737 |
| 5,362,099 | 11/1994 | Föhl | 280/737 |
| 5,427,160 | 6/1995 | Carson et al. | 141/4 |

*Primary Examiner*—Kenneth R. Rice
*Attorney, Agent, or Firm*—Tarolli, Sundheim, Covell, Tummino & Szabo

[57] ABSTRACT

An air bag inflator (10) contains inflation fluid in a chamber (40) in a container (20). The container (20) has a fluid outlet (28) closed by a closure means (30). An assembly (50) connected with the container (20) includes a fill tube (120) for filling the container (20) with inflation fluid (42). A glass seal (140) blocks leakage of inflation fluid from the chamber (40) around the fill tube. In a preferred embodiment, the assembly (50) is an igniter assembly that includes two electrodes (100, 110). The glass seal (140) blocks fluid leakage from the chamber (40) around the electrodes (110, 110).

17 Claims, 2 Drawing Sheets

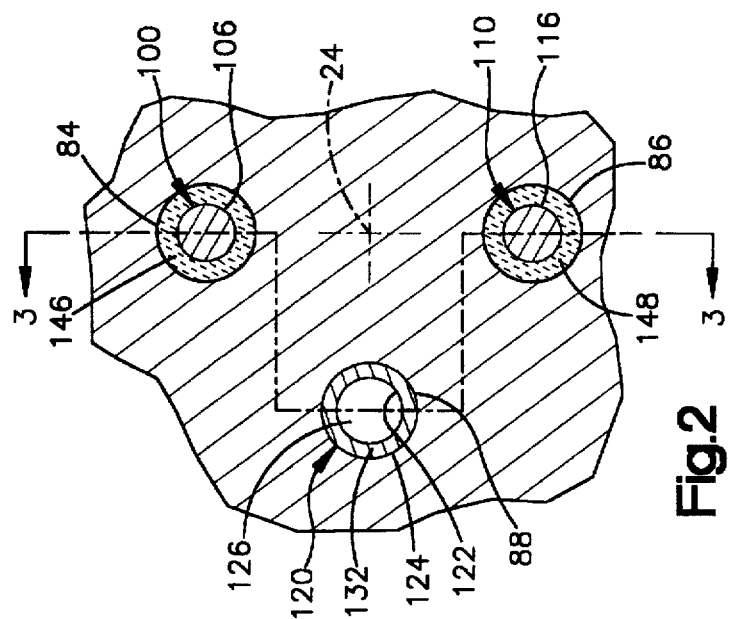
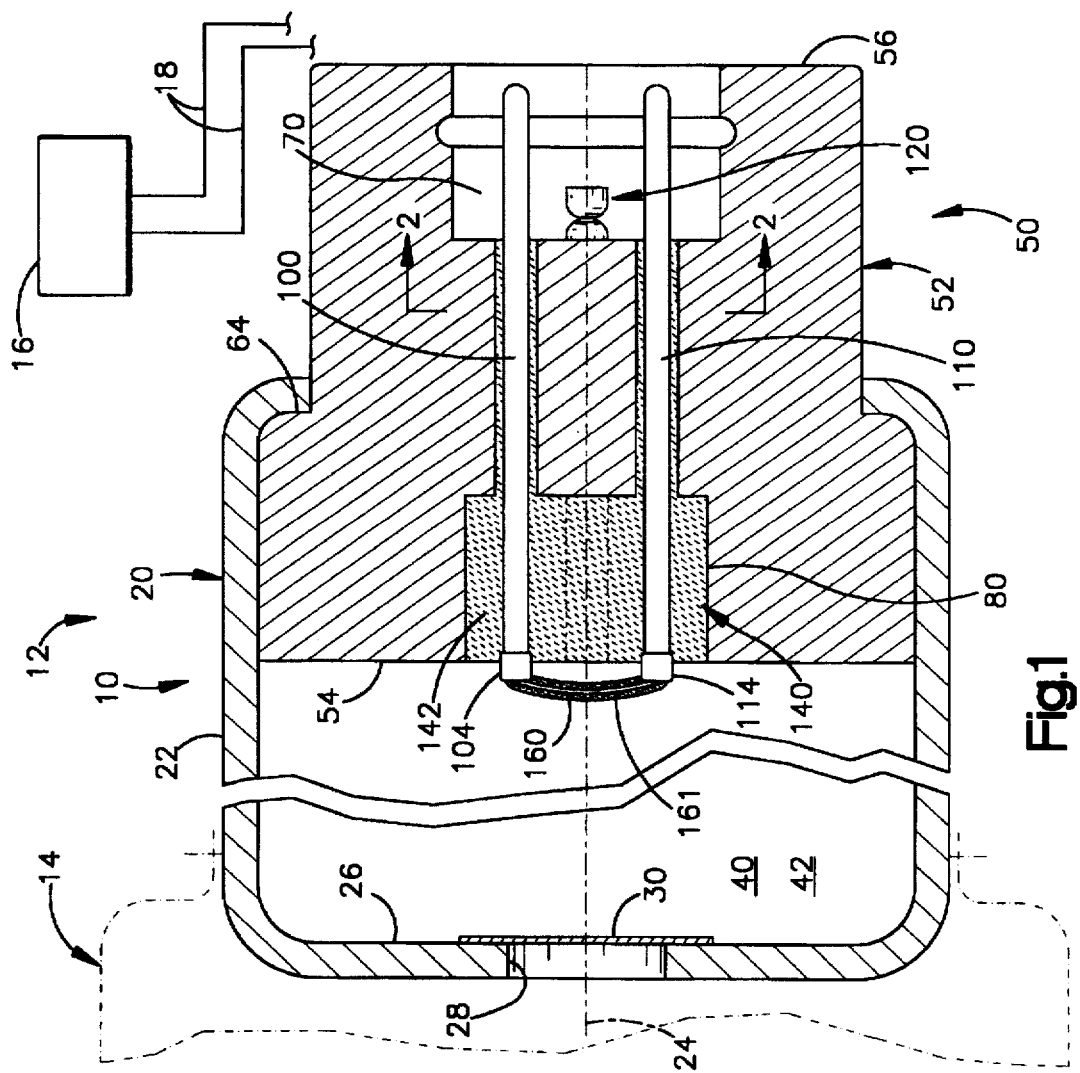

FILL TUBE FOR AIR BAG INFLATOR

BACKGROUND OF THE INVENTION

1. Technical Field

The present invention relates to an apparatus for inflating an inflatable vehicle occupant protection device, such as an air bag. In particular, the present invention relates to a fill tube for an inflator which contains inflation fluid stored under pressure for inflating an air bag.

2. Description of the Prior Art

It is known to inflate an inflatable vehicle occupant device, such as an air bag, to help protect a vehicle occupant. The air bag is inflated with inflation fluid supplied by an inflator. Some inflators use gas stored under pressure in a container for inflating the air bag. Other inflators use gas stored under pressure, in combination with an ignitable material for heating the gas to increase the pressure of the gas. The ignitable material may be a pyrotechnic material or it may be a combustible fluid.

An inflator which includes gas stored under pressure in a container also includes some structure for enabling filling of the container with gas. This structure is typically a fill tube extending through an opening in a wall of the container. The opening around the fill tube is sealed in a manner such as by welding. Inflation fluid under pressure is directed into the container through the fill tube. The fill tube is then closed to block leakage of inflation fluid out of the container.

SUMMARY OF THE INVENTION

The present invention is an apparatus for inflating an inflatable vehicle occupant protection device. The apparatus comprises a container defining a chamber containing inflation fluid for inflating the inflatable device. The container has a fluid outlet for enabling flow of inflation fluid out of the container to inflate the inflatable device, and means for closing the fluid outlet. An assembly connected with the container includes a fill tube for conducting inflation fluid from a location outside of the chamber to the chamber. The assembly further includes a glass seal for blocking fluid leakage from the chamber around the fill tube.

In a preferred embodiment, the chamber contains inflation fluid and an ignitable material. The assembly comprises an igniter for igniting the ignitable material and means for connecting the igniter with the container. The igniter comprises a first electrode and a second electrode. The igniter further comprises means for generating thermal energy, connected between the first and second electrodes, for igniting the ignitable material in response to the flow of electric current between the first and second electrodes. The glass seal blocks leakage of inflation fluid from the chamber around the first and second electrodes.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view, partly in section, of a vehicle safety apparatus including an air bag inflator which is constructed in accordance with the present invention;

FIG. 2 is an enlarged view of a portion of the inflator of FIG. 1; and

DESCRIPTION OF A PREFERRED EMBODIMENT

Figure 3:
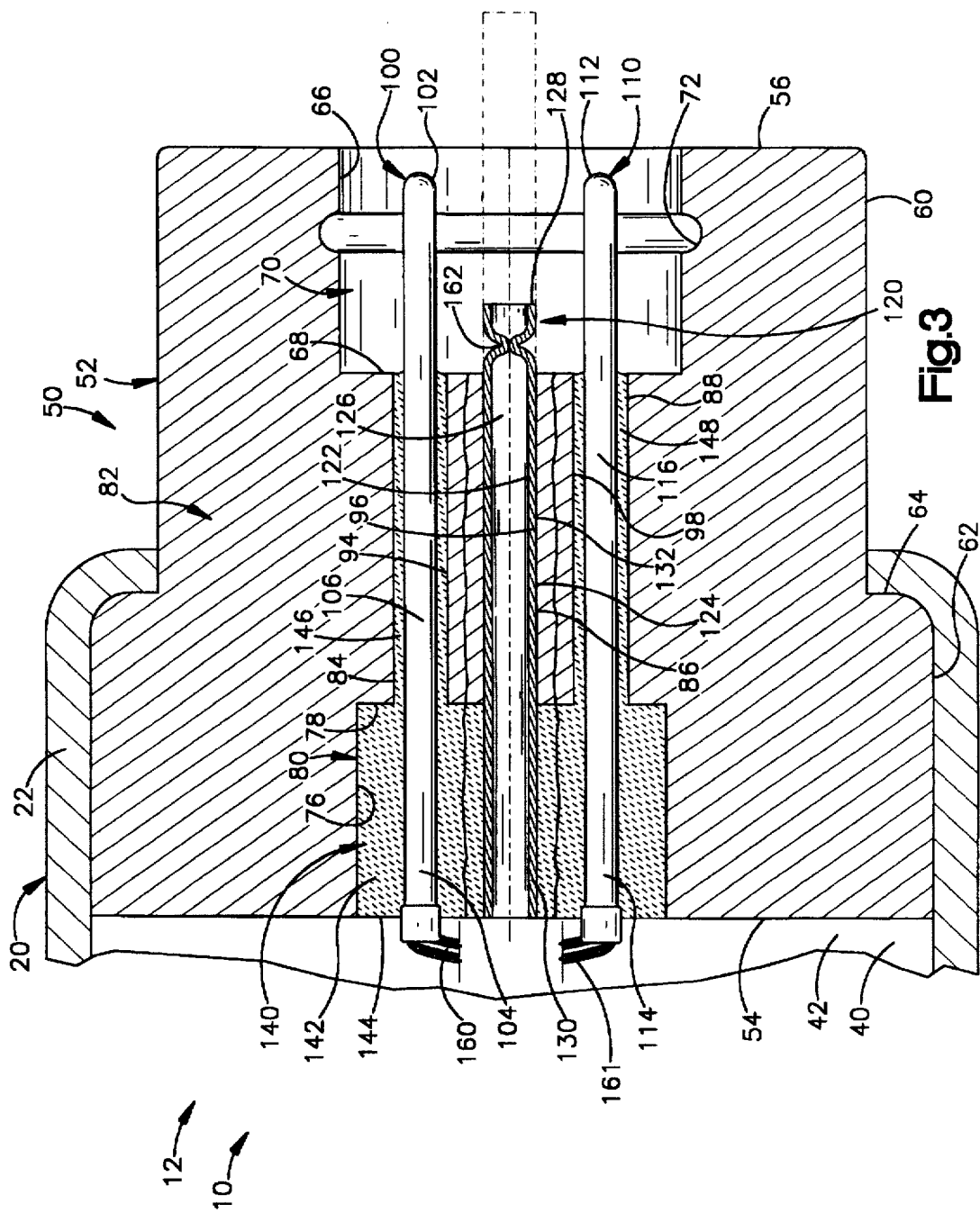
FIG. 3 is a sectional view taken along line 3—3 of FIG. 2.

The present invention relates to an apparatus for inflating an inflatable vehicle occupant protection device, such as an air bag. In particular, the present invention relates to a fill tube for an inflator which contains inflation fluid in the form of gas stored under pressure for inflating an air bag. As representative of the present invention, FIG. 1 illustrates schematically an air bag inflator 10. The air bag inflator 10 forms a part of a vehicle occupant safety apparatus 12.

The safety apparatus 12 includes a particular type of inflatable vehicle occupant protection device 14 which is commonly referred to as an air bag. The vehicle safety apparatus 12 also includes vehicle electric circuitry indicated schematically at 16 (FIG. 1) for sensing an impact to the vehicle and for actuating the inflator 10 in response to the sensing of an impact. The electric circuitry 16 includes a power source, which is preferably the vehicle battery and/or a capacitor, and a normally open switch. The switch is part of a sensor which senses a condition indicating the occurrence of an impact to the vehicle. If the collision-indicating condition sensed by the sensor is above a predetermined threshold, it indicates the occurrence of an impact to the vehicle for which inflation of the air bag 14 is desired to help protect an occupant of the vehicle. The sensor then closes the switch, and the electrical circuitry sends an actuation signal to the inflator 10 over lead wires 18.

The inflator 10 includes a container illustrated schematically at 20. The container 20 is preferably formed of metal, such as steel or aluminum. The container 20 could alternatively be formed of a different material, such as a composite plastic material.

The container 20 has a cylindrical side wall 22 which is centered on an axis 24. A radially extending end wall 26 of the container 20 has a fluid outlet opening 28. A member for closing the opening, illustrated as a burst disk 30, extends across the opening 28 to close the container.

The container 20 defines a chamber 40 which holds a mixture 42 of gases. The mixture 42 of gases preferably includes a fuel gas, an oxidizer gas for supporting combustion of the fuel gas, and an inert gas. The mixture 42 of gases in the chamber 40 readily combusts when ignited, but otherwise is not explosive. As such, the mixture 42 of gases could have any one of many different compositions.

The mixture 42 of gases in the chamber 40 is normally stored under pressure. The mixture 42 of gases in the chamber 40 may be at a storage pressure of 500 to 6,000 pounds per square inch (psi), possibly more depending on temperature. However, the storage pressure may differ from these values.

An igniter assembly 50 is connected with the container 20 at an end of the container opposite from the end wall 26. The igniter assembly includes an igniter body or shell 52 which is preferably made from a metal such as stainless steel. The shell 52 has a generally cylindrical configuration centered on the axis 24. The shell 52 has opposite, radially extending inner and outer end surfaces 54 and 56.

The shell 52 includes a smaller diameter first portion 60 (FIG. 3) and a larger diameter second portion 62 between which is located a shoulder 64. An end portion of the container side wall 22 is curled over at the shoulder 64 to connect the igniter assembly 50 to the container 20.

A cylindrical inner side surface 66 and a radially extending outer end surface 68 of the shell 52 define a first cavity 70 in the shell. The first cavity 70 extends axially from the outer end surface 56 of the shell 52 in a direction toward the inner end surface 54 of the shell. The first cavity 70 is configured for receiving a known electrical connector (not shown) for conducting electric current from the lead wires 18 to the inflator 10 to actuate the inflator. A locking groove 72 is formed in the side surface 66 for helping to secure the electrical connector on the igniter assembly 50.

Another cylindrical inner side surface 76 of the shell 52 and another radially extending surface 78 define a second cavity 80 of the shell. The second cavity 80 and the first cavity 70 are formed in opposite end portions of the shell 52. The second cavity 80 extends axially from the inner end surface 54 of the shell 52 in a direction toward the outer end surface 56. The second cavity 80 is separated from the first cavity 70 by a bulkhead portion 82 of the shell 52.

Three parallel, spaced apart passages 84, 86 and 88 extend through the bulkhead portion 82 of the shell 52 between the first cavity 70 and the second cavity 80. The passages 84-88 are preferably formed by drilling through the bulkhead portion 82.

The first passage or first electrode opening 84 is defined by a cylindrical surface 96 which extends parallel to the axis 24. The second passage or second electrode opening 88 is defined by a cylindrical surface 98 which extends parallel to the axis 24. The second electrode opening 88 is spaced apart from the first electrode opening 84. The third passage or fill tube opening 86 is defined by a cylindrical surface 96 which extends parallel to the axis 24. The fill tube opening 86 is spaced apart from the first electrode opening 84 and from the second electrode opening 88.

The igniter assembly 50 includes a first terminal pin or electrode 100. The first electrode 100 is made from an electrically conductive material, such as a nickel alloy, and has an elongate, cylindrical configuration. A first end portion 102 of the first electrode 100 is disposed in the first cavity 70 in the shell 52. A second end portion 104 of the first electrode 100 is disposed in the second cavity 80 in the shell 52. A central portion 106 of the first electrode 100 extends through the first electrode opening 84 in the bulkhead portion 82 of the shell 52. The central portion 106 of the first electrode 100 is spaced apart from the material of the shell 52, that is, from the cylindrical surface 96 which defines the first electrode opening 84.

The igniter assembly 50 includes a second terminal pin or electrode 110 which is identical to the first electrode 100. A first end portion 112 of the second electrode 110 is disposed in the first cavity 70 in the shell 52. A second end portion 114 of the second electrode 110 is disposed in the second cavity 80 in the shell 52. A central portion 116 of the second electrode 100 extends through the second electrode opening 88 in the bulkhead portion 82 of the shell 52. The central portion 116 of the second electrode 110 is spaced apart from the material of the shell 52, that is, from the cylindrical surface 98 which defines the second electrode opening 88 in the shell.

The igniter assembly 50 further includes a fill tube 120 which is preferably made from steel. The fill tube 120 has a tubular configuration defined by parallel, axially extending inner and outer side surfaces 122 and 124. The inner side surface 122 of the fill tube 120 defines a fill passage 126 which extends axially through the fill tube.

A first end portion 128 of the fill tube 120 is disposed in the first cavity 70 in the shell 52 and projects from the outer end surface 68 of the shell. The first end portion 128 of the fill tube 100 has an elongate, open-ended configuration, as shown in phantom in FIG. 3, prior to filling of the container 20.

A second end portion 130 of the fill tube 120 is disposed in the second cavity 80 in the shell 52. A central portion 132 of the fill tube 120 extends through the fill tube opening 86 in the bulkhead portion 82 of the shell 52. The fill tube 120 is press fit in the fill tube opening 86. Alternatively, the fill tube 120 may be slightly smaller in diameter than the fill tube opening 86 so that the outer surface 124 of the fill tube is spaced apart from the cylindrical surface 96 which defines the fill tube opening.

The igniter assembly 50 includes a glass seal 140. The glass seal 140 forms a hermetic seal in the igniter assembly 50 to block leakage of inflation fluid from the chamber 40 through the igniter assembly. The glass seal 140 also electrically insulates between the shell 52 and the first and second electrodes 100 and 110.

The glass seal 140 has a main body portion 142 which is disposed in the second cavity 80 in the shell 52. The main body portion 142 of the glass seal 140 has an inner end surface 144 which is exposed to and is in contact with the mixture 42 of gases in the chamber 40.

The main body portion 142 of the glass seal 140 extends around and seals around the inner end portion 104 of the first electrode 100. Thus, the main body portion 142 of the glass seal 140 blocks fluid leakage out of the chamber 40 around the first electrode 100. The main body portion 142 of the glass seal 140 also extends around and seals around the inner end portion 114 of the second electrode 110. Thus, the main body portion 142 of the glass seal 140 blocks fluid leakage out of the chamber 40 around the second electrode 110.

The main body portion 142 of the glass seal 140 also extends around and seals around the inner end portion 130 of the fill tube 120. Thus, the main body portion 142 of the glass seal 140 blocks fluid leakage out of the chamber 40 around the fill tube 120.

A first tubular portion 146 of the glass seal 140 is disposed in the first electrode opening 84 in the bulkhead portion 82 of the shell 52. The first tubular portion 146 of the glass seal 140 has an annular configuration extending between the first electrode 100 and the surface 96 which defines the first electrode opening 84. The first tubular portion 146 of the glass seal 140 electrically insulates between the first electrode 100 and the shell 52. The first tubular portion 146 of the glass seal 140 also helps to seal, that is, to block fluid leakage out of, the chamber 40 around the first electrode 100.

A second tubular portion 148 of the glass seal 140 is disposed in the second electrode opening 88 in the bulkhead portion 82 of the shell 52. The second tubular portion 148 of the glass seal 140 has an annular configuration extending between the second electrode 110 and the surface 98 which defines the second electrode opening 88. The second tubular portion 148 of the glass seal 140 electrically insulates between the second electrode 110 and the shell 52. The second tubular portion 148 of the glass seal 140 also helps to seal, that is, to block fluid leakage out of, the chamber 40 around the second electrode 110.

Because the fill tube 120 is press fit in the fill tube opening 86 in the shell 52, the glass seal 140 does not extend into the fill tube opening. Alternatively, if the fill tube 120 is constructed to be smaller in diameter than the fill tube opening 86, then a tubular portion of the glass seal 140 extends into the annular space between the outer surface 124 of the fill tube 120 and the cylindrical surface 96 which defines the fill tube opening 86.

The igniter assembly 50 further includes a heating element in the form of a bridgewire 160. The bridgewire 160 is connected between the inner end portions 104 and 114 of the electrodes 100 and 110, respectively. The bridgewire 160 projects axially from the inner end surface 54 of the shell 52. The bridgewire 160 is a fine diameter wire formed of an electrically conductive ignition material. Preferred materials for the bridgewire 160 include alloys of stainless steel, tungsten, and nickel-chromium.

A body of pyrotechnic material 161 is disposed on the bridgewire 160. The pyrotechnic material 161 is preferably formed as a thin layer (shown exaggerated in size for clarity) on the bridgewire 160, or could surround the bridgewire. The body of pyrotechnic material 161 could be packed in a cup or shell around the bridgewire 160.

When the igniter assembly 50 is secured to the container 20 as described above, the only fluid flow path between the chamber 40 and the exterior of the inflator is through the fill passage 126 in the fill tube 120. The container 20 is filled with the mixture 42 of gases as desired through the fill passage 126 in the fill tube 120. When the desired mixture 42 of gases is in the chamber 40, the fill tube 120 is pinch welded at 162 and cut to length, to the condition shown in solid lines in FIG. 2, so as to seal the fill tube.

The electrical connector (not shown) is connected with the inflator 10 when the inflator is installed in a vehicle. The electrical connector includes a clearance cavity for avoiding contact with the projecting outer end portion 128 of the fill tube 120. When the inflator 10 is actuated as described above, electric current flows through the igniter assembly 50 between the electrodes 100 and 110. The electric current flows through the bridgewire 160. The bridgewire 160 resistively generates heat which ignites the body of pyrotechnic material 161. The heat from the body of the pyrotechnic material 161 ignites the fuel gas in the mixture 42 of gases in the chamber 40.

The resulting combustion of the fuel gas is supported by the oxidizer gas. As the fuel gas burns, the pressure in the chamber 40 rises because warming of the gases by the heat of combustion created by burning of the fuel gas. After a predetermined time, or when a predetermined pressure is reached in the chamber 40, the burst disk 30 opens. The warm gas is thus released to flow from the chamber 40 into the air bag 14 (FIG. 1). The air bag 14 is inflated to help protect an occupant of the vehicle.

It may be desirable to remove the mixture 42 of gases from the container 20 after filling and sealing of the container. This can be done by clipping off the exposed outer end portion 128 of the fill tube 120.

The present invention is also applicable to an inflator having only stored gas, that is, inflation fluid with no additional ignitable material. The present invention is also applicable to inflators which use a pyrotechnic material in the chamber, in place of or in addition to a combustible fluid, for heating the inflation fluid to increase the pressure of the inflation fluid. The present invention is, further, applicable to inflators for use in inflating air bags to help protect either a driver or a passenger of a vehicle, from either a frontal impact or from a side impact to the vehicle.

Alternative igniter assemblies can be used in an inflator which is constructed in accordance with the present invention. For example, a spark gap can be left between the inner end portions 104 and 114 of the electrodes 100 and 110, respectively. Also, the present invention is applicable to an igniter assembly which includes a pyrotechnic material for generating heat to actuate the inflator.

Further, the present invention can be used in conjunction with a structure other than an igniter assembly. For example, a pressure sensor for sensing the pressure of inflation fluid in a chamber of an inflator typically includes one or more terminal pins or electrodes which connect with vehicle electric circuitry. These electrodes may be sealed with a glass seal through which extends a fill tube for the inflator. Thus, a fill tube for an inflator can advantageously be located in an existing assembly having a glass seal for blocking fluid leakage from the inflator. Adding the fill tube to the existing assembly does not require providing additional sealing capabilities, as would be the case with a fill tube fitted in a hole drilled in a container wall.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant protection device, said apparatus comprising:

a container defining a chamber containing inflation fluid for inflating the inflatable device, said container having a fluid outlet for enabling flow of inflation fluid out of said container to inflate the inflatable device;

means for closing said fluid outlet; and an assembly connected with said container, said assembly including a fill tube for conducting inflation fluid from a location outside of said chamber to said chamber, said assembly further including a glass seal for blocking fluid leakage from said chamber around said fill tube.

2. An apparatus as set forth in claim 1 wherein said assembly includes a shell member secured to said container, said glass seal being disposed between said fill tube and said shell member for blocking fluid leakage between said fill tube and said shell member.

3. An apparatus as set forth in claim 1 wherein said fill tube has an end portion which projects from an outer end surface of said assembly.

4. An apparatus as set forth in claim 3 wherein said assembly comprises surfaces defining a first cavity for receiving an electrical connector, said surfaces including said outer end surface of said assembly.

5. An apparatus as set forth in claim 1 wherein said assembly comprises first and second electrodes, said glass seal blocking fluid leakage from said chamber around said first and second electrodes.

6. An apparatus as set forth in claim 5 further comprising an ignitable material in said chamber, said assembly further including means for generating thermal energy for igniting said ignitable material in response to the flow of electric current between said first and second electrodes, said means for generating being connected between said first and second electrodes.

7. An apparatus as set forth in claim 6 wherein said ignitable material comprises a combustible fluid which is mixed with said inflation fluid in said chamber.

8. An apparatus as set forth in claim 5 wherein said assembly comprises a shell member having passages through which said fill tube and said first and second electrodes extend, said glass seal having a first portion which is disposed in a first one of said passages and which electrically insulates between said first electrode and said shell member, a second portion of said glass seal being disposed in a second one of said passages and electrically insulating between said second electrode and said shell member, a third portion of said glass seal being disposed in a cavity in said shell member and sealing between said fill tube and said first and second electrodes and said shell member.

9. An apparatus as set forth in claim 1 wherein said assembly comprises a shell member which has an outer end portion defining a first cavity for receiving an electrical connector, an inner end portion of said shell member defining a second cavity, said glass seal being at least partially disposed in said second cavity, said assembly comprising at least one electrically conductive member extending through said shell member between said outer cavity and said inner cavity, said glass seal blocking fluid leakage from said chamber around said at least one electrically conductive member.

10. An apparatus for inflating an inflatable vehicle occupant protection device, said apparatus comprising:

a container defining a chamber containing inflation fluid and an ignitable material;

an igniter for igniting said ignitable material; and means for connecting said igniter with said container;

said igniter comprising a first electrode, a second electrode, and a glass seal extending between said first and second electrodes and said container for blocking leakage of inflation fluid from said chamber around said first and second electrodes;

said igniter further comprising means for generating thermal energy, connected between said first and second electrodes, for igniting said ignitable material in response to the flow of electric current between said first and second electrodes;

said apparatus further comprising a fill tube for conducting inflation fluid from a location outside of said chamber to said chamber, said glass seal extending between said fill tube and said container for blocking leakage of inflation fluid from said chamber around said fill tube.

11. An apparatus as set forth in claim 10 wherein said ignitable material comprises a combustible fluid which is mixed with said inflation fluid in said chamber.

12. An apparatus as set forth in claim 10 wherein said igniter further comprises a shell member having passages through which said first and second electrodes and said fill tube extend, said glass seal having a first portion which is disposed in a first one of said passages and which electrically insulates between said first electrode and said shell member, a second portion of said glass seal being disposed in a second one of said passages and electrically insulating between said second electrode and said shell member, a third portion of said glass seal being disposed in a cavity in said shell member and sealing between said fill tube and said first and second electrodes and said shell member.

13. An apparatus as set forth in claim 10 wherein said igniter comprises a shell member secured to said container, said glass seal being disposed between said fill tube and said shell member for blocking fluid leakage between said fill tube and said shell member.

14. An apparatus as set forth in claim 13 wherein said shell member has an electrical connector cavity, said fill tube having a portion which projects into said electrical connector cavity.

15. An apparatus for inflating an inflatable vehicle occupant protection device, said apparatus comprising:

a container defining a chamber containing inflation fluid and an ignitable material;

an igniter for igniting said ignitable material; and means for connecting said igniter with said container;

said igniter comprising a first electrode, a second electrode, a header supporting said first and second electrodes, and a glass seal extending between said first electrode and said header for blocking leakage of inflation fluid from said chamber around said first electrode;

said igniter further comprising means for generating thermal energy, connected between said first and second electrodes, for igniting said ignitable material in response to the flow of electric current between said first and second electrodes;

said apparatus further comprising a fill tube extending through said header for conducting inflation fluid from a location outside of said chamber to said chamber.

16. An apparatus as set forth in claim 15 wherein said ignitable material comprises a combustible fluid which is mixed with said inflation fluid in said chamber.

17. An apparatus as set forth in claim 15 wherein said header has an electrical connector cavity, said fill tube having a portion which projects into said electrical connector cavity.

* * * * *